(12) United States Patent
Sanada

(10) Patent No.: US 6,697,646 B2
(45) Date of Patent: Feb. 24, 2004

(54) TRANSCEIVER THAT PROHIBIT THE VIBRATION MOTOR

(75) Inventor: Daisuke Sanada, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 500 days.

(21) Appl. No.: 09/757,711

(22) Filed: Jan. 10, 2001

(65) Prior Publication Data

US 2001/0021662 A1 Sep. 13, 2001

(30) Foreign Application Priority Data

Jan. 11, 2000 (JP) ........................................ 2000-002176

(51) Int. Cl.⁷ ................................................ H04B 7/00
(52) U.S. Cl. ...................................................... 455/567
(58) Field of Search .............................. 455/567, 550.1, 455/73

(56) References Cited

U.S. PATENT DOCUMENTS 5,867,796 A * 2/1999 Inutsuka ..................... 455/567
6,188,916 B1 * 2/2001 Noda et al. ................. 455/567
6,216,017 B1 * 4/2001 Lee et al. .................... 455/567
2001/0021662 A1 * 9/2001 Sanada ........................ 455/567

FOREIGN PATENT DOCUMENTS

| EP | 0887985 | * 12/1998 |
| JP | 09247759 | * 9/1997 |
| JP | 409247759 | * 9/1997 |
| JP | 10-136060 | 5/1998 |

* cited by examiner

Primary Examiner—William Cumming
(74) Attorney, Agent, or Firm—RatnerPrestia

(57) ABSTRACT

A transceiver comprises a vibration motor for vibrating the transceiver itself in order to notice a call to a user. The vibration motor is driven when a receiving unit issues a received signal in a vibration mode. The vibration motor is prohibited, for a specific time, from being driven when the user operates a specific action such as pushing a transmission button. The transceiver can make a recipient pay attention by vibration without disturbing the user attending, for example, a meeting. Since the vibration motor is not driven while a transmission or reception is repeated within the specific time, users can talk smoothly with the transceiver.

8 Claims, 2 Drawing Sheets

TRANSCEIVER THAT PROHIBIT THE VIBRATION MOTOR

FIELD OF THE INVENTION

The present invention relates to a transceiver composed of a transmitting section and a receiving section, for transmitting and receiving signals based on channels and a device identification code.

BACKGROUND OF THE INVENTION

For short distance communications at construction sites or the like, recently, transceivers are widely used because it is easy to talk without using telephone numbers.

A conventional transceiver will now be described. When transmitting from one side, the user pushes the transmission-button of a transmitting section in the transceiver, and the transceiver is then set in a push-to-talk (PTT), i.e., a transmission mode. In the transmission mode, the audio signal entered from the microphone is sent to an oscillation/modulation circuit, and a carrier signal of, for example, 460 MHz is modulated. The modulated signal is amplified in a transmission output unit, and sent out as a radio signal.

The transmission mode is also established by pushing a calling-tone button. That is, by pushing the calling-tone button, a calling-tone signal, e.g. a single-frequency signal of 1000 Hz, is sent to the oscillation/modulation circuit, modulates the carrier signal, and sent out as a radio signal.

Further, in a transceiver having a continuous-tone-controlled system (CTCSS) unit, the transmission side CTCSS unit generates a CTCSS signal as a device identification code signal. The device identification code signal is similarly sent into the oscillation/modulation circuit, modulates the carrier signal, and sent out.

The modulated signals of the audio signal, the calling-tone signal, and the device identification code signal (CTCSS signal) are sent to the receiving unit in the transceiver.

If the CTCSS signal is contained in the signals received by the receiving unit, the CTCSS signal is extracted by a CTCSS unit in the receiving section. A controller judges whether the device-identification code, i.e., the CTCSS signal, coincides with the identification code of the own device or not. If so, the controller further judges whether the calling-tone signal is entered or not.

In the case that the transceiver is set in a vibration mode for calling the user by vibration, the calling-tone signal is fed into a vibration-motor driver. When the calling-tone signal is entered, the vibration motor rotates to cause vibration. In other modes than vibration mode, the calling-tone signal is sent to a speaker, which generates a calling-tone.

In the conventional transceiver, if the calling-tone signal is entered in other modes than the vibration mode, the calling-tone is always delivered from the speaker, and, if it is during a meeting, for example, a meeting is disturbed. Or, in the vibration mode, whenever the calling tone signal is entered, the vibration motor rotates. Therefore, even while talking with other partner, the vibration motor rotates when called from a different terminal. And therefore, the transceiver-body vibrates and the talk is disturbed. Or, when he/she is called in operations for various settings, the transceiver-body vibrates. That is too bothersome to operate the transceiver correctly.

SUMMARY OF THE INVENTION

A transceiver including a receiving section capable of limiting the rotation of the vibration motor when receiving a calling signal, and talking and operating smoothly is presented.

The transceiver comprises the receiving unit for amplifying and outputting a received signal from a transmitting/receiving antenna, a vibration motor for vibrating the transceiver itself, and a motor driver for driving the vibration motor. When the receiving unit outputs a received signal in a vibration mode, the vibration motor is driven, and later when it is judged that the specified operation has been preformed, the vibration motor is prohibited from being driven for a specified time.

Therefore, when a recipient is called during a meeting with the transceiver in the vibration mode, the vibration motor is driven to make the recipient pay attention without disturbing the meeting. Still more, since the vibration motor is prohibited from rotating by a specified operation, the meeting goes smoothly and smooth talk is possible.

The transceiver has a receiving section comprising:

(a) a demodulator for demodulating a received signal, and outputting a squelch signal when a level of the received signal is sufficiently large, (b) a device-identification-code detector for detecting the device-identification-code signal included in the received signal, and outputting a judgement signal showing whether the device identification code is that of the transceiver itself or not, (c) a vibration motor for vibrating the transceiver itself, (d) a motor driver for driving the vibration motor, (e) a function-setting-input unit for setting the vibration mode for driving the vibration motor, and (f) a controller for controlling the entire transceiver.

The controller judges that a squelch signal is sent from the demodulator and that the sent device identification code is that the transceiver itself. Further, the controller, when judging that the vibration mode is set with the function-setting-input unit, drives the vibration motor with the motor driver. And later, when judging that the specified operation has been performed, the controller operates to prohibit, for a specific time, the vibration motor from being driven.

Therefore, when an appropriate received signal is first entered, the vibration motor is driven and making a recipient pay attention without disturbing the meeting. And further, the vibration motor is prohibited from rotating by calling-tone signal.

DESCRIPTION OF THE PREFERRED EMBODIMENT

Figure 1:
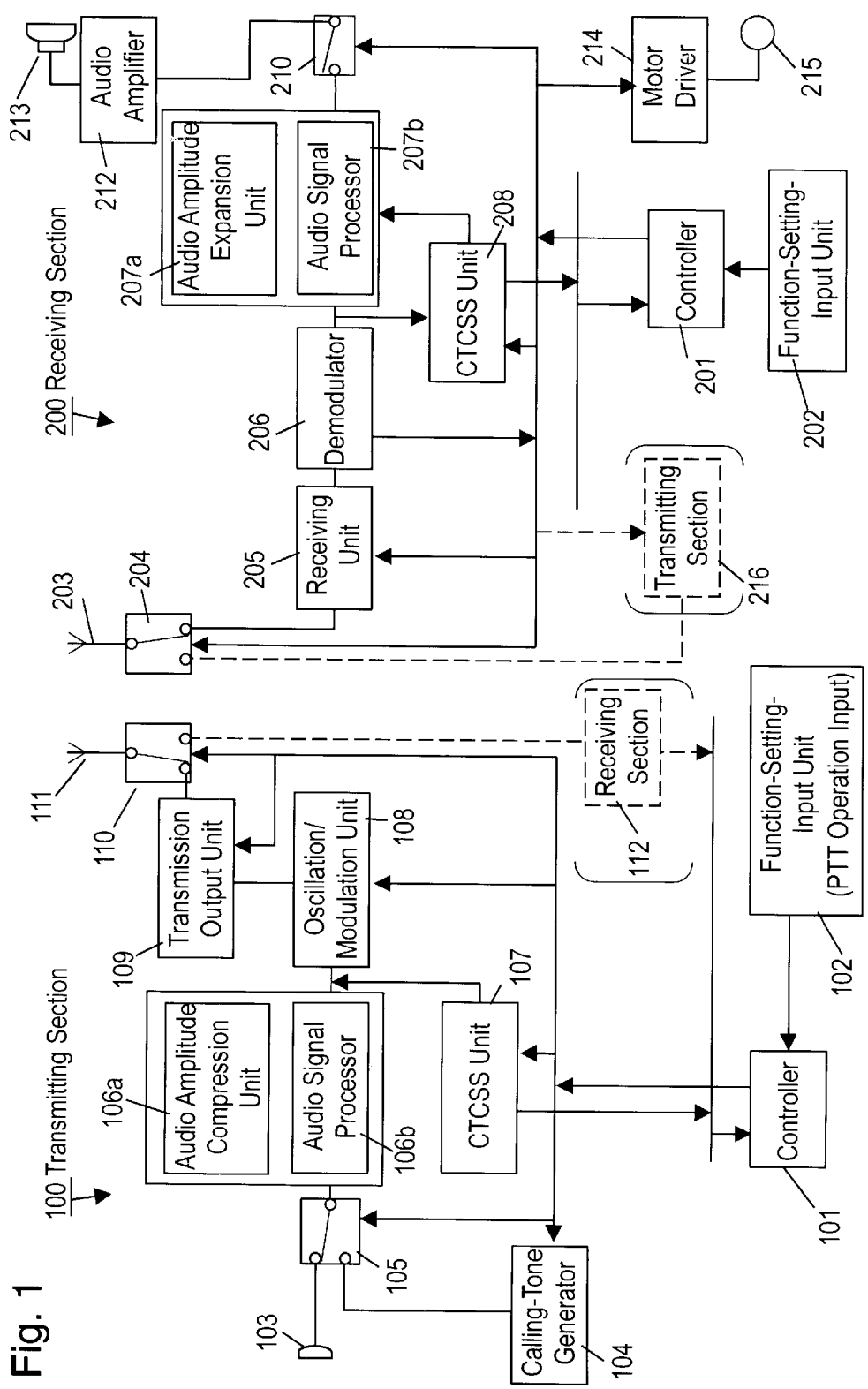
FIG. 1 is a block diagram of a transceiver having a receiving section according to an embodiment of the invention.

FIG. 1 is a block diagram showing a transceiver having a receiving section according to a preferred embodiment of the invention, in which two users are supposed to talk by using the same transceivers. FIG. 1 shows a transmitting section 100 of the transceiver held by one user, and a receiving section 200 of the transceiver held by the other user.

The transceiver comprises transmitting section 100 and receiving section 200. In transmitting section 100, controller 101 controls the entire transceiver, and function-setting-input unit 102 sets it to a push-to-talk (PTT) private mode, channel, a continuous tone controlled system (CTCSS) code, a device identification code, and so on. Calling-tone generator 104 issues a calling-tone signal, a signal of a specific single frequency, for example, 1000 Hz by pushing a calling-tone button (not shown). Audio selecting switch 105 selects microphone 103 and calling-tone generator 104. Audio-amplitude-compression unit 106a and audio signal processor 106b compress the audio signal entered from selecting switch 105. CTCSS unit 107 generates a device-identification-code signal, as a CTCSS code signal. Oscillation/modulation circuit 108 generates a carrier signal, modulates the signal by the audio signal output from audio signal processor 106b, and issues a modulated signal. Transmission output unit 109 amplifies and issues the modulated signal from oscillation/modulation circuit 108. Transmitting/receiving selecting switch 110 selects the transmission or the reception of the transceiver. Transmitting unit 100 further comprises transmitting/receiving antenna 111.

Controller 101 receives data from CTCSS unit 107 and receiving section 112, and controls the calling-tone generator 104, audio selecting switch 105, CTCSS unit 107, oscillation/modulation circuit 108, transmission output unit 109, and transmitting/receiving selecting switch 110. Controller 101 further controls the oscillation frequency in oscillation/modulation circuit 108, i.e., the channel number, and controls the output level of the transmission output unit 109.

In receiving section 200, controller 201 controls the entire receiving section. Function-setting-input unit 202 sets a programmable communication controller (PCC), a channel, a CTCSS unit, a vibration mode, and so on. Transmitting/receiving selecting switch 204 selects the transmission or reception of the transceiver. Receiving unit 205 amplifies and issues the received signal from transmitting/receiving antenna 203. Demodulator 206 demodulates the received signal, and issues a squelch signal if the level of the received signal is sufficiently large. Audio amplitude expansion unit 207a and audio signal processor 207b expand the demodulated signal entered from demodulation circuit 206. CTCSS unit 208 is a device-identification-code detector which detects a device-identification code included in the demodulated signal from demodulator 206, and issues a judgement signal showing whether the device-identification code is that of the transceiver itself or not. Audio muting switch 210 controls whether or not to deliver the audio signal from audio signal processor 207b. Audio amplifier 212 amplifies the audio signal, and sends to speaker 213. Motor driver 214 drives vibration motor 215 vibrating a transceiver body.

Controller 201 receives data from demodulator 206 and CTCSS unit 208, and controls transmitting/receiving selecting switch 204, receiving unit 205, CTCSS unit 208, and audio muting switch 210. Controller 201 further controls the frequency of the received signal of receiving unit 205, i.e., a channel number, thereby avoiding to receive a signal of other channel than the channel number assigned to the transceiver.

The transceiver comprises transmitting section 100 and receiving section 200 described above. In actual, the transceiver having transmitting section 100 in FIG. 1 has receiving section 112, and the transceiver having the receiving section 200 has a transmitting section 216. Receiving section 112 and transmitting unit 216 are composed the same as receiving section 200 and transmitting section 100, respectively.

Figure 2:
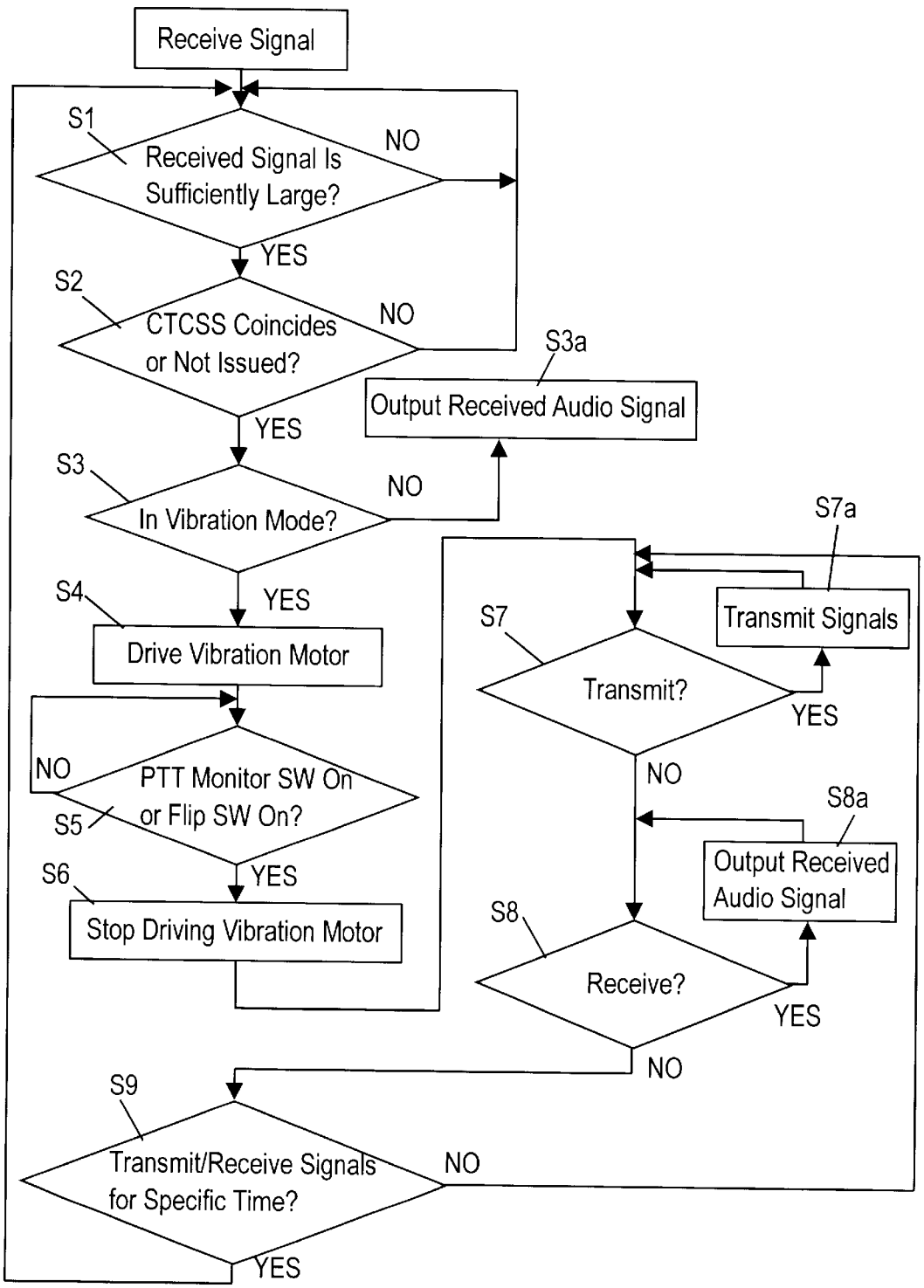
FIG. 2 is a flowchart of the operation of the receiving section of the transceiver shown in FIG. 1.

The operation of the transceiver will be described with referring to FIG. 2. Herein, it is supposed two users talk by holding the transceivers. FIG. 2 is a flowchart showing the operation of the receiving section of the transceiver in FIG. 1.

When one user pushes the transmission button, the transceiver is set in a push-to-talk (PTT) mode, i.e., a transmission mode. That is, by pushing the transmission button, function-setting-input unit 102 notices to controller 101 that the operation is the PTT mode. Receiving this notice, controller 101 sets transmitting/receiving selecting switch 110 to the transmission side, which is shown in FIG. 1. In this setting, when an audio signal entered through microphone 103 is compressed by audio-amplitude-compression unit 106a and audio signal processor 106b. Oscillation/modulation circuit 108 modulates a carrier signal of, for example, 460 MHz with the compressed audio signal, and issues a modulated signal. The modulated signal is amplified in transmission output unit 109 and is sent out as a radio signal from transmitting/receiving antenna 111 through transmitting/receiving selecting switch 110.

By pushing a calling-tone button, not shown in the drawing, it is also set in the transmission mode. That is, by pushing the calling-tone button, function-setting-input unit 102 notices to controller 101 that the calling-tone is set. Receiving this notice, controller 101 switches transmitting/receiving selecting switch 110 to the transmission side, and also switches audio selecting switch 105 to the calling-tone side. Controller 101 further processes the calling-tone signal issued from calling-tone generator 104, e.g. the single frequency signal of 1000 Hz in the same manner as the audio signal. And then, the calling-tone signal is sent out as a radio signal from transmitting/receiving antenna 111.

Further, in CTCSS unit 107, a device-identification-code signal (CTCSS signal) is generated and similarly sent to oscillation-modulation circuit 108. The signal modulates the carrier signal and is sent out.

To receiving section 200 of the transceiver held by the other user, modulated signals of the audio signal, the calling-tone signal, and the device identification code signal (the CTCSS signal) arrives.

Now, it is supposed receiving section 200 is in the receiving-state where transmission button or calling-tone button is not pressed. At this time, receiving unit 205 receives the modulated signal from transmitting/receiving antenna 204. Receiving unit 205 amplifies the received signal and issues it to demodulator 206 when the channel number of the received signal, i.e., the received signal frequency, coincides with the number set with function-setting-input unit 202. Demodulator 206 demodulates the received signal, issues it as a demodulated signal, and judges whether the received signal is sufficiently large or not. When judging it is sufficiently large, demodulator 206 issues a squelch signal to controller 201. CTCSS unit 208 detects the device identification code signal, judges whether the device identification code coincides with that of the transceiver itself or not, and sends the result to controller 201 as a judgement signal.

Controller 201 is noticed that the received signal is sufficiently large when the squelch signal from demodulator 206 is entered (step SI). When the squelch signal is not entered, the operation is in a waiting state. Based on the judgement signal from CTCSS unit 208, controller 201 judges if the device identification signal conforms to the transceiver itself or not (step S2). If the device identification code does not conforms to it, the operation is set in a waiting state. Some transceivers, however, don't issue the device identification code, and in such case, to judge whether the identification signal conforms to it is skipped (step S2).

When the received signal is sufficiently large, and when the device identification signal is conforming, controller 201 judges if the transceiver is set in a vibration mode or not based on the data from function-setting-input unit 202 (step S3). When judging to be in the vibration mode, controller 201 drives vibration motor 215 through motor driver 214 (step S4). When the transceiver is not in the vibration mode, the received audio signal is output (step S3a).

Next, controller 201 judges whether any one of the transmission button (PTT switch), a receive button (monitor switch), and a private-talk-mode-setting switch (flip switch) is pressed or not (step S5). If any button (switch) has been pressed, it is regarded that the user is made pay attention, and then, vibration motor 215 stops rotating (step S6).

Further, controller 201 judges whether the operation is in a transmission or not (step S7), and sends signals in the case of transmission (step S7a). If the operation is not in the transmission, controller 201 judges whether the operation is in a reception or not (step S8), and issues a received audio signal in the case of the reception (step S8a), and goes to step S9 if not in the reception.

At step S9, controller 201 judges whether a specified time has passed since the user operated a certain action, for example, since the user turns on the transmission button to stop to drive the vibration motor or since the carrier signal is no longer received. If the specified time does not elapses, the process returns to step S7. That is, within the specified time, step S7, step S8, and step S9 are repeated.

At step S7, it is judged whether in transmission state or not by monitoring whether any one of the send button, calling tone button, and private talk mode setting switch has been turned on or not. At step S8, it is judged whether it is in the reception state or not by monitoring whether the carrier signal is received or not, i.e. whether the squelch signal is issued or not.

As, for example, the user is called, vibration motor 215 begins to rotate. And, then, responding to it, the user pushes the transmission-button (or PTT switch) to stop the rotating of vibration motor 215. Controller 201 judges whether the transceiver continues not to be in a transmission or reception for a specific time after the transmission-button (PTT switch) has been pressed. Within the specified time, the vibration motor is not driven even if the condition for driving it is established. At step S9, a timer is reset whenever the transceiver becomes in a transmission or receives the carrier signal. Therefore, if the transmission or reception is repeated within the specific time, the vibration motor is not driven.

If the transceiver continues not to be in the transmission or reception continues for the specific time, e.g. 30 seconds, the operation returns to step S1. That is, when the condition of driving the vibration motor is established again, controller 201 drives vibration motor 215 again to make the user pay attention.

In this embodiment, based on that the squelch signal is issued from demodulator circuit 206, controller 201 judges that the received device identification code coincides with that of the transceiver itself. When judging that the vibration mode has been set with function-setting-input unit 202, controller 201 judges that the condition for driving the vibration motor has been established, and drives vibration motor 215 immediately, thereby making the user pay attention without disturbing the meeting. If judging that a specific operation has been performed after driving vibration motor 215, controller 201 prohibits, for a specific time, motor 215 from being driven. Consequently, if a transmission or reception is repeated within the specific time, vibration motor 215 is not driven, and the user can therefore talk smoothly.

When judging that any one of the transmission button for starting a transmission, the receive button for excluding the output of squelch signal from the condition of the vibration motor driving, and the private-talk-mode-setting switch for setting a private-talk mode for enabling to talk without pressing the transmission button has been pressed, controller 201 prohibits, for a specific time, vibration motor 215 from being driven.

While judging that the transceiver transmits or receives signals after prohibiting vibration motor 215 from being driven, controller 201 maintains to prohibit vibration motor 215 from being driven. When judging that the transceiver does not transmit or receive signals for a specific time, controller 201 cancels to prohibit motor 215 from being driven. After the cancellation, when judging that the condition of driving the vibration motor is established, controller 201 drives vibration motor 215 through motor driver 214. Thus, after the talk is over, the rotating of motor 215 makes the user pay attention again.

What is claimed is:

1. A transceiver comprising:
   a transmitting/receiving antenna;
   a receiving unit for amplifying and issuing a received signal from said transmitting/receiving antenna;
   a vibration motor for giving vibration;
   a motor driver driving said vibration motor; and
   a controller operable to:
      drive said vibration motor through said motor driver when said receiving unit issues the received signal in a vibration mode; and
      then prohibit, for a specific time, said vibration motor from being driven when judging that a specified operation has been performed,
   wherein said controller cancels to prohibit said vibration motor from being driven when said controller judges that said transceiver does not transmit or receive a signal for a specific time.

2. The transceiver according to claim 1 further comprising:
   a transmission button for starting a transmission; and
   a private-talk-mode-setting switch for setting a private talk mode for enabling to transmit a signal without pressing said transmission button,
   wherein said controller prohibits, for the specific time, said vibration motor from being driven when said controller judges that at least one of said transmission button and said private-talk-mode-setting switch is pressed.

3. The transceiver according to claim 1,
   wherein said controller maintains to prohibit said vibration motor from being driven while said controller judges that said transceiver transmits or receives a signal after said controller prohibits said vibration motor from being driven.

4. A transceiver comprising:
   a transmitting/receiving antenna;
   a receiving unit for amplifying and issuing a received signal from said transmitting/receiving antenna;
   a demodulator for demodulating the received signal;
   a device-identification-code detector for detecting a device identification code included in the received signal and for issuing a judgement signal showing whether the device identification code coincides with an identification code of said transceiver or not;

a vibration motor for giving vibration;

a motor driver driving said vibration motor; and a controller operable to:
  drive said vibration motor through said motor driver when the device identification code included in the received signal coincides a device identification code of said transceiver in a vibration mode; and
  then prohibit, for a specific time, said vibration motor from being driven when judging that a specified operation has been performed, wherein said controller cancels to prohibitt said vibration motor from being driven when said controller judges that said transceiver does not transmit or receive a signal for a specific time.

5. A transceiver comprising:

a demodulator for demodulating a received signal, and issuing a squelch signal when a level of the received signal is sufficiently large;

a device-identification-code detector for detecting a device identification code included in the received signal and for issuing a judgement signal showing whether the device identification code coincides with a device identification code of said transceiver;

a vibration motor for giving vibration;

a motor driver for driving said vibration motor;

a function-setting-input unit for setting a vibration mode for driving said vibration motor; and a controller operable to:
  drive said vibration motor through said motor driver when judging that a driving condition of said vibration motor is established by that the squelch signal is sent from said demodulator, that the device identification code included in the received signal coincides with the identification code of said transceiver based on the judgement signal, and that the vibration mode is set with said function-setting-input unit;
  then prohibit, for a specific time, said vibration motor from being driven when judging that a specified operation has been performed; and
  cancel to prohibit said vibration motor from being driven when judging that said transceiver does not transmit or receive a signal for a specific time while prohibiting said vibration motor from being driven.

6. The transceiver according to claim 5, wherein said controller, while prohibiting said vibration motor from being driven, operable to:

maintain to prohibit said vibration motor from being driven when judging that said transceiver transmits or receive a signal; and drive said vibration motor through said motor driver when judging that the driving condition of said vibration motor is established after canceling to prohibit said vibration motor from being driven.

7. A transceiver comprising:

a demodulator for demodulating a received signal, and issuing a squelch signal when a level of the received signal is sufficiently large;

a device-identification-code detector for detecting a device identification code included in the received signal and for issuing a judgement signal showing whether the device identification code coincides with a device identification code of said transceiver;

a vibration motor for giving vibration;

a motor driver for driving said vibration motor;

a function-setting-input unit for setting a vibration mode for driving said vibration motor;

a controller operable to:
  drive said vibration motor through said motor driver when judging that a driving condition of said vibration motor is established by that the squelch signal is sent from said demodulator, that the device identification code included in the received signal coincides with the identification code of said transceiver based on the judgement signal, and that the vibration mode is set with said function-setting-input unit;
  then prohibit, for a specific time, said vibration motor from being driven when judging that a specified operation has been performed;

a transmission button for starting a transmission;

a receive button for excluding to send the squelch signal from the driving condition of said vibration motor; and a private-talk-mode-setting switch for setting a private talk mode for enabling to transmit a signal without pressing said transmission button, wherein said controller, for a specific time, prohibits said vibration motor from being driven when judging that at least one of said transmission button, said receive button, and said private-talk-mode-setting switch.

8. The transceiver according to claim 7, wherein said controller, while prohibiting said vibration motor from being driven, operable to:

maintain to prohibit said vibration motor from being driven when judging that said transceiver transmits or receives a signal;

cancel to prohibit said vibration motor from being driven when judging that said transceiver does not transmit or receive a signal for a specific time; and drive said vibration motor through said motor driver when judging that the driving condition of said vibration motor is established after canceling to prohibit said vibration motor from being driven.

* * * * *